Patented July 6, 1926.

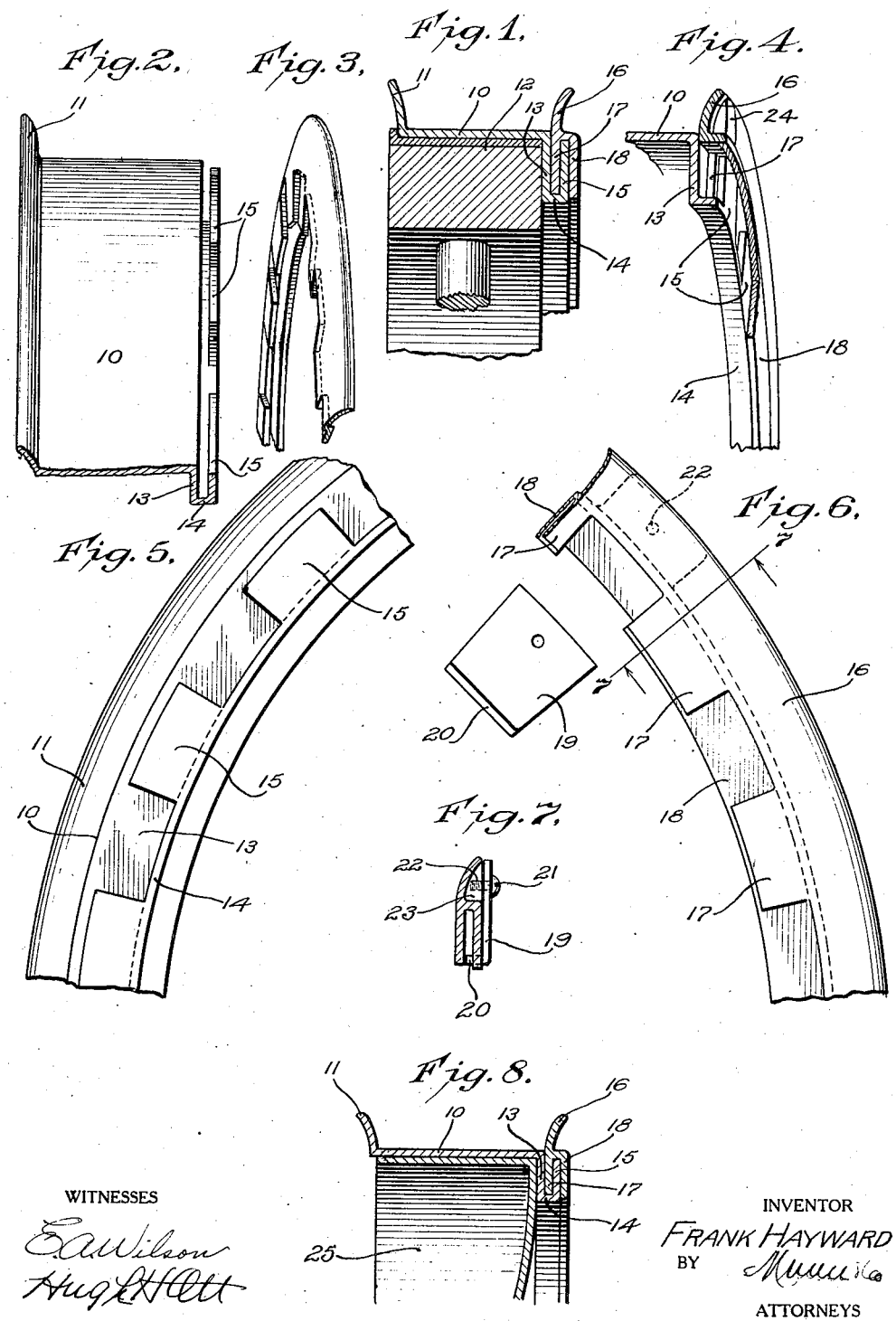

1,591,819

UNITED STATES PATENT OFFICE.

FRANK HAYWARD, OF BROOKLYN, NEW YORK.

TIRE RIM.

Application filed July 27, 1925. Serial No. 46,473.

This invention relates to rims for vehicle tires, and has particular reference to means for quickly and efficiently associating a tire with the rim.

One of the outstanding objects of the present invention resides in the provision of a rim having stationary and removable flanges at the opposite sides thereof in which an improved interlocking means is provided for detachably connecting the removable flange with the rim.

More specifically the invention comprehends a tire rim of the type which is either permanently or demountably associated with the felly of the wheel, and which rim includes a stationary tire-engaging flange at one side and a removable tire-engaging flange at the opposite side, in which the means of connection between the removable flange consists of circumferentially spaced radially projecting locking fingers on the flange and rim adapted upon relative circumferential movement of the flange with respect to the rim, to dispose the said fingers into or out of locking engagement, together with means for retaining the flange in a circumferentially shifted position to dispose the fingers in locking engagement with the rim fingers.

The invention furthermore comprehends a rim for vehicle tires which is comparatively simple in its construction and mode of operation, which is highly efficient in its purpose, and which is inexpensive to manufacture.

With the above recited and other objects in view, reference is had to the accompanying specification and drawings in which there is exhibited one example or embodiment of the invention which is in no way intended as a limitation upon the scope of the appended claims as it is to be clearly understood that variations and modifications which properly fall within the scope of said claims may be resorted to when found expedient.

In the drawings—

Figure 1 is a fragmentary transverse sectional view through a vehicle wheel equipped with a rim constructed in accordance with the invention;

Fig. 2 is a fragmentary edge view of the rim with the removable flange disengaged therefrom;

Fig. 3 is a fragmentary perspective view of the removable flange;

Fig. 4 is a fragmentary sectional perspective view illustrating the removable flange in applied relation to the rim;

Fig. 5 is a fragmentary side view of the rim with the removable flange displaced;

Fig. 6 is a similar view of the removable flange removed from the rim with the locking element in juxtaposition;

Fig. 7 is a detail sectional view taken approximately on the line 7—7 of Fig. 6, with the locking element in applied position;

Fig. 8 is a fragmentary transverse sectional view of the rim as applied to wheels of the disk type.

Referring to the drawings by characters of reference, 10 designates a rim provided at one side with a peripheral stationary tire-engaging flange 11, and adapted to be secured upon the felly 12 of the wheel. At the side opposite to the stationary flange 11, the rim is provided with a radial inwardly bent flange 13 lying alongside the felly 12 and formed with an outwardly or laterally bent bead 14 from which circumferentially spaced radial outwardly projecting fingers 15 project. A removable tire-engaging flange 16 is provided which is formed with a plurality of complementary radial inwardly projecting fingers 17 and with a laterally offset inturned annular concealing apron 18. The fingers 15 are spaced apart a distance slightly in excess of the length of the fingers 17, and the fingers 17 are correspondingly spaced apart a distance slightly in excess of the length of the fingers 15, whereby upon relative circumferential shifting movement of the removable tire-engaging flange 16 with respect to the rim, the mating or interengageable fingers 17 are disposed in axial alinement with the space between the fingers to permit of the application or removal of the flange 16 from the rim 10. To engage the fingers 17 in interlocking relation with the fingers 15, the rim is shifted until the said fingers are in axial alinement, and in order to lock or retain the flange 16 in locked associated relation with the rim, a locking or retaining element in the nature of a clip or lug 19 is provided, which is formed with an inturned terminal 20 insertable through the space between the pairs of adjacent alined fingers 15 and 17. The clip or element 19 is apertured to receive therethrough an anchoring screw 21, which is threaded within the threaded opening 22 in a boss 23 formed on the removable flange 16. The removable flange 16 is provided with circumferentially spaced lugs 24, similar to the boss 23, to afford means for engaging a hammer or other tool therewith to effect a relative turning movement of the removable flange with respect to the rim 10 for engaging or disengaging the fingers 15 and 17.

The invention as illustrated in Fig. 8, discloses the structure as applied to wheels 25 of the disk-wheel type, in which instance the rim is permanently secured to the wheel.

What is claimed is:

1. A vehicle tire rim including an annular rim body having a stationary tire-engaging flange at one edge, a removable tire-engaging flange for the opposite edge, interengageable means of connection between said latter flange and the rim body, operable to connect and disconnect the same upon relative circumferential shifting movement thereof, said means of connection consisting of circumferentially spaced radial outwardly projecting fingers on the rim and circumferentially spaced radial inwardly projecting fingers on the removable flange, and a concealing and projecting apron projecting radially inward from the removable flange.

2. A vehicle tire rim including an annular rim body having a stationary tire-engaging flange at one edge, a removable tire-engaging flange for the opposite edge, interengageable means of connection between said latter flange and the rim body, operable to connect and disconnect the same upon relative circumferential shifting movement thereof, said means of connection consisting of circumferentially spaced radial outwardly projecting fingers on the rim and circumferentially spaced radial inwardly projecting fingers on the removable flange, a concealing and projecting apron projecting radially inward from the removable flange, and retaining means for holding the rim and the removable flange against relative movement when shifted to dispose the fingers in alined locking relation, consisting of a lug detachably associated with the removable flange and provided with a hooked terminal insertable between adjacent pairs of fingers on the rim body and removable flange.

FRANK HAYWARD.